Jan. 28, 1930. E. B. GOODFELLOW 1,744,883
KITCHEN AND TABLE ARTICLE
Filed June 12, 1928
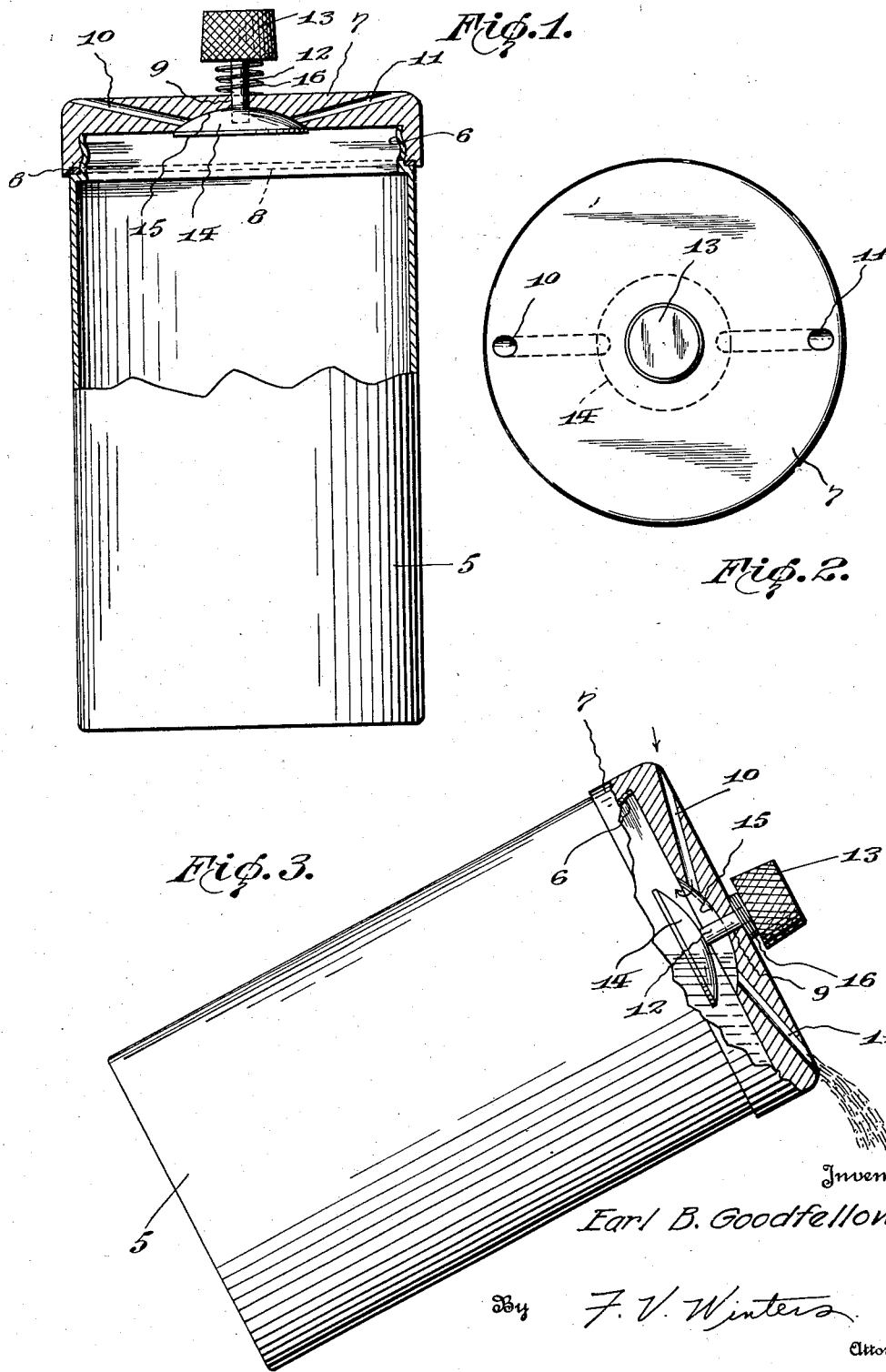
Inventor:
Earl B. Goodfellow.
By F. V. Winters
Attorney Patented Jan. 28, 1930

1,744,883

UNITED STATES PATENT OFFICE

EARL B. GOODFELLOW, OF NEW YORK, N. Y.

KITCHEN AND TABLE ARTICLE

Application filed June 12, 1928. Serial No. 284,709.

This invention relates to kitchen and table articles, and the improvements are directed to a novel form of article adapted to contain a liquid, or the like, said article including a co-related assemblage of component parts whereby the contents may be maintained in a sanitary condition and which will permit the pouring of said contents simultaneously with the admission of air.

Primarily, the invention is featured by the provision of a novel form of closure member adapted for attachment to a suitable container or receptacle in a manner to hermetically seal the contents therein to the end that dust and other foreign substances may be positively excluded and said contents maintained in a sanitary condition under the varying temperature influences.

Another object is to provide means in the form of portways whereby the contents of said receptacle may be discharged therefrom simultaneously with the admission of air thereto.

Still another object of the invention resides in the provision of valve means, normally closing said portways and adapted to be operated to permit the passage of a liquid from the receptacle simultaneously with the admission of air to said receptacle by way of a companion portway.

A still further object is the specific arrangement of portways in a closure member whereby the cooperative valve means aforesaid permits the discharge of the liquid through either of the portways, according to the desires of the user, the other of said portways permitting the entrance of air to destroy the vacuum-producing tendency within the receptacle during the pouring operation.

With these objects in view, together with others which will appear as the description proceeds, the invention resides in the novel formation, combination, and arrangement of parts, all as will be described more fully hereinafter, illustrated in the drawings and particularly pointed out in the claims.

In said drawings:

Figure 1 is a sectional view of the article, partly in elevation, and illustrating the construction of the closure member and associated parts.

Fig. 2 is a plan view thereof; and

Fig. 3 is a view like unto Fig. 1, but depicting the operation of the article, that is, the discharge of the liquid through one portway and simultaneous entrance of air into said receptacle, all through the intermediary of the valve means.

As will presently appear my inventive overt act consists first in the provision of a closure member whereby perishable commodities, milk for instance, may be hermetically sealed in a receptacle or container, said closure member being so arranged that the contents of the receptacle may be dispensed at will and immediately after use, the contents will be again restored to its hermetic condition.

Referring now in detail to the accompanying drawings, wherein like characters of reference denote similar parts throughout the several views, let 5 denote the receptacle portion of the article, the same being composed of glass, porcelain or metal, the open upper end portion thereof being slightly reduced in diameter and corrugated to present means for the threaded engagement with the closure member 7. As clearly shown in Fig. 1 I prefer to provide a gasket 8 to positively exclude the entrance of air at the point of connection of the respective parts.

Said closure member 7 is provided with a vertical aperture 9, and portways 10 and 11, the former being adapted to slidably receive the stem 12 having a head 13 at one end and a valve 14 on the other. Upon inspection of Fig. 1, it will be observed that the central inner face of said closure member 7 is recessed, as indicated at 15 and that said portways have their inner ends leading therefrom and extendinig divergently to the marginal outer face of said closure. The upper surface of said valve 14 accurately conforms to the contour of the face of said recess 15 and its intimate contact therewith, in view of the spring 16 encircling said stem 12, positively closes the inner ends of said portways to the exclusion of air or dust.

The normal position of the parts just described is shown in Fig. 1, and hence when it is desired to remove a portion of the contents of the receptacle, the finger or thumb of the user depresses the head 13, thus tensioning the spring 16, and removing said valve member 14 from contact with the recess 15 and opening the inner ends of said portways 10 and 11. With the parts in this position the receptacle is inclined approximately to the position shown in Fig. 3, wherein it will be noted that the contents of the receptacle is now escaping by way of portway 11, but at the same time air may enter the other portway 10 and thus a free and easy passage is assured, since the entrance of the air, as indicated by the arrows, maintains atmospheric conditions within said receptacle sufficient to destroy any partial vacuum that might otherwise prove present. As soon as the pressure on 13 is released the spring forces the valve into contact with the recess 15 and the portways are sealed.

In view of the unique arrangement of portways, either thereof may be used to discharge the liquid in the receptacle, the other, of course, permitting the entrance of air as aforesaid. Thus no special mode of operation is vitally necessary to the successful operation of the article in view of the foregoing.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. An article of the class described including a receptacle, a closure therefor provided with a recess in its inner face and having portways extending divergently from the recess to the outer surface of said closure and spring-operated means normally closing the inner terminals of said portways and adapted to be operated to permit the passage of a liquid from the receptacle through one portway simultaneously with the admission of air to the receptacle through the other of said portways.

2. An article of the class described including a receptacle, a closure therefor provided with a recess in its inner face and having a pair of portways extending divergently from the recess and terminating adjacent the margin of the outer face of said closure and valve means normally seating within said recess and closing the inner ends of said portways and adapted to be operated to permit the passage of a liquid from the receptacle through one portway simultaneously with the admission of air to the receptacle through the other of said portways.

3. An article of the class described including a receptacle, a closure therefor presenting a thickened top portion and having a pair of portways divergent from the central inner face of said closure and terminating adjacent the margin thereof, said closure having its inner face provided with a recess in communication with said portways and a spring-operated member having a valve head normally seating in said recess and closing the inner ends of said portways and adapted to be operated to open said portways to permit the passage of a liquid from said receptacle through one portway simultaneously with the admission of air to the receptacle through the other of said portways.

In testimony whereof I affix my signature.

EARL B. GOODFELLOW.